US011854018B2

(12) United States Patent
Patten, Jr. et al.

(10) Patent No.: US 11,854,018 B2
(45) Date of Patent: Dec. 26, 2023

(54) LABELING OPTIMIZATION THROUGH IMAGE CLUSTERING

(71) Applicant: INTERNATIONAL BUSINESS MACHINES CORPORATION, Armonk, NY (US)

(72) Inventors: Willie Robert Patten, Jr., Hurdle Mills, NC (US); Eugene Irving Kelton, Wake Forest, NC (US); Yi-Hui Ma, Mechanicsburg, PA (US); Brandon Harris, Union City, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 591 days.

(21) Appl. No.: 17/147,595

(22) Filed: Jan. 13, 2021

(65) Prior Publication Data
US 2022/0222683 A1    Jul. 14, 2022

(51) Int. Cl.
*G06Q 30/018*       (2023.01)
*G06F 16/55*        (2019.01)
(Continued)

(52) U.S. Cl.
CPC ......... *G06Q 30/0185* (2013.01); *G06F 16/54* (2019.01); *G06F 16/55* (2019.01);
(Continued)

(58) Field of Classification Search
CPC ..... G06Q 30/0185; G06F 16/54; G06F 16/55; G06F 18/214; G06F 18/22; G06N 20/00; G06V 10/74; G06V 10/762; G06V 10/774
See application file for complete search history.

(56) References Cited

U.S. PATENT DOCUMENTS

| 10,375,098 B2 * | 8/2019 | Oliner ..................... G06N 5/01 |
| 11,631,497 B2 * | 4/2023 | Asthana ................ G06N 20/00 |
| | | 705/2 |

(Continued)

OTHER PUBLICATIONS

IBM: List of IBM Patents or Patent Applications Treated as Related (Appendix P), Jan. 27, 2021, pp. 1-2.

(Continued)

*Primary Examiner* — Solomon G Bezuayehu
(74) *Attorney, Agent, or Firm* — Rakesh Roy

(57) ABSTRACT

A method, computer system, and a computer program product for labeling optimization is provided. The present invention may include receiving a plurality of labeled historical transaction timeline image clusters based on a plurality of historical transaction timeline images clustered using unsupervised machine learning. The present invention may further include training an image recognition model using supervised machine learning based on the received plurality of labeled historical transaction timeline image clusters. The present invention may also include receiving, by the trained image recognition model, a current transaction timeline image. The present invention may further include assigning a corresponding label to the received current transaction timeline image based on matching the received current transaction timeline image to one of the received plurality of labeled historical transaction timeline image clusters.

20 Claims, 11 Drawing Sheets

(51) Int. Cl.
  *G06N 20/00* (2019.01)
  *G06F 16/54* (2019.01)
  *G06F 18/22* (2023.01)
  *G06F 18/214* (2023.01)

(52) U.S. Cl.
  CPC ............ *G06F 18/214* (2023.01); *G06F 18/22* (2023.01); *G06N 20/00* (2019.01)

(56) References Cited

U.S. PATENT DOCUMENTS

| | | | | |
|---|---|---|---|---|
| 2007/0022069 | A1* | 1/2007 | Goodman | G06N 20/00 706/25 |
| 2016/0379132 | A1* | 12/2016 | Jin | H04L 67/535 706/12 |
| 2017/0330075 | A1* | 11/2017 | Tuysuzoglu | G06N 7/08 |
| 2018/0276541 | A1* | 9/2018 | Studnitzer | G06N 3/044 |
| 2019/0236782 | A1* | 8/2019 | Amit | G06T 7/0016 |
| 2019/0340614 | A1* | 11/2019 | Hanis | G06F 18/23 |
| 2020/0218890 | A1* | 7/2020 | Mehta | G06V 40/172 |
| 2021/0350376 | A1* | 11/2021 | Rosenthal | G06V 30/40 |

OTHER PUBLICATIONS

Kelton et al., "Classifying Behavior Through System-Generated Timelines and Deep Learning," Application and Drawings, filed May 5, 2020, 32 Pages, U.S. Appl. No. 16/867,355.

Chen et al., "Machine Learning Techniques for Anti-Money Laundering (AML) Solutions in Suspicious Transaction Detection: a Review," Knowledge and Information Systems 57, No. 2, pp. 245-285, 2018.

Dasgupta et al., "Hierarchical Sampling for Active Learning," in Proceedings of the 25th international conference on Machine learning (ICML '08). ACM, pp. 208-215, 2008.

Guan et al., "Improving supervised learning performance by using fuzzy clustering method to select training data." Journal of Intelligent & Fuzzy Systems, IOS Press, 19 (2008) 321-334.

Hu et al., "Off to a Good Start: Using Clustering to Select the Initial Training Set in Active Learning," AAAI Publications, 23rd International FLAIRS Conf. www.aaai.org/ocs/index.php/FLAIRS/2010/paper/viewPaper/1305, pp. 26-31.

Ienco et al., "Clustering Based Active Learning for Evolving Data Streams." In: Fürnkranz J., Hüllermeier E., Higuchi T. (eds) Discovery Science. DS 2013. Lecture Notes in Computer Science, vol. 8140. Springer, pp. 79-93, 2013.

Krueger et al., "Facetto: Combining Unsupervised and Supervised Learning for Hierarchical Phenotype Analysis in Multi-Channel Image Data." bioRxiv 722918, https://www.biorxiv.org/content/10.1101/722918v1, 11 pages.

Mell et al., "The NIST Definition of Cloud Computing", National Institute of Standards and Technology, Special Publication 800-145, Sep. 2011, 7 pages.

Nguyen et al., "Active learning using pre-clustering." In Proceedings of the twenty-first international conference on Machine learning (ICML '04). ACM, 2004, 8 pages.

Peikari et al., "A Cluster-then-label Semi-supervised Learning Approach for Pathology Image Classification," Scientific Reports, (2018) 8:7193, DOI:10.1038/s41598-018-24876-0, 13 pages.

Suzumura et al., "Towards Federated Graph Learning for Collaborative Financial Crimes Detection," arXiv preprint arXiv:1909.12946, 2019, 10 pages.

Hanis et al., "Cognitive Methodology for Sequence of Events Patterns in Fraud Detection Using Event Sequence Vector Clustering," Application and Drawings, filed May 4, 2018, 34 Pages, U.S. Appl. No. 15/971,960.

Hanis et al., "Cognitive Methodology for Sequence of Events Patterns in Fraud Detection Using Petri-Net Models," Application and Drawings, filed May 4, 2018, 33 Pages, U.S. Appl. No. 15/971,943.

Sim et al., "Is Deep Learning for Image Recognition Applicable to Stock Market Prediction?" Hindawi Complexity, vol. 2019, Article ID 4324878, 10 pages, https://doi.org/10.1155/2019/4324878.

Tensorflow, "Basic classification: Classify images of clothing," [accessed Jan. 13, 2021], Retrieved from the Internet: <https://www.tensorflow.org/tutorials/keras/classification>, 11 pages.

Varghese, "Image clustering using Transfer learning," Towards Data Science, Feb. 2, 2019, [accessed Jan. 13, 2021], Retrieved from the Internet: <https://towardsdatascience.com/image-clustering-using-transfer-learning-df5862779571>, 7 pages.

Wong, "Building a Similar Images Finder without any training!" Towards Data Science, Dec. 15, 2017, [accessed Jan. 13, 2021], Retrieved from the Internet: <https://towardsdatascience.com/building-a-similar-images-finder-without-any-training-f69c0db900b5>, 5 pages.

* cited by examiner

LABELING OPTIMIZATION THROUGH IMAGE CLUSTERING

BACKGROUND

The present invention relates generally to the field of computing, and more particularly to deep event vision technology.

Predicting human behavior can be extremely difficult, but it can also be very useful for a wide variety of purposes such as business, financial, and law enforcement. One example that spans all of these areas is fraud detection. Fraud detection has become a special form of technology. Some of the most common applications of fraud detection are for credit card fraud, bank fraud, medical fraud, welfare fraud, and insurance fraud. The stakes in these areas are extremely high. A recent study showed that merchants in the United States alone lost nearly 200 billion dollars in a single year to credit card fraud.

Fraud appears in many different forms and the detection of fraud relies on a system with the capability to recognize or discover these fraudulent activities/events. Events occur within time and space, usually at predictable occurrences. This allows traditional fraud detection logic to build fixed rules according to the particular circumstances to recognize potential fraud and flag it for further review. More advanced approaches to fraud detection may be implemented using cognitive technology.

SUMMARY

Embodiments of the present invention disclose a method, computer system, and a computer program product for labeling optimization. The present invention may include receiving a plurality of labeled historical transaction timeline image clusters based on a plurality of historical transaction timeline images clustered using unsupervised machine learning. The present invention may further include training an image recognition model using supervised machine learning based on the received plurality of labeled historical transaction timeline image clusters. The present invention may also include receiving, by the trained image recognition model, a current transaction timeline image. The present invention may further include assigning a corresponding label to the received current transaction timeline image based on matching the received current transaction timeline image to one of the received plurality of labeled historical transaction timeline image clusters.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
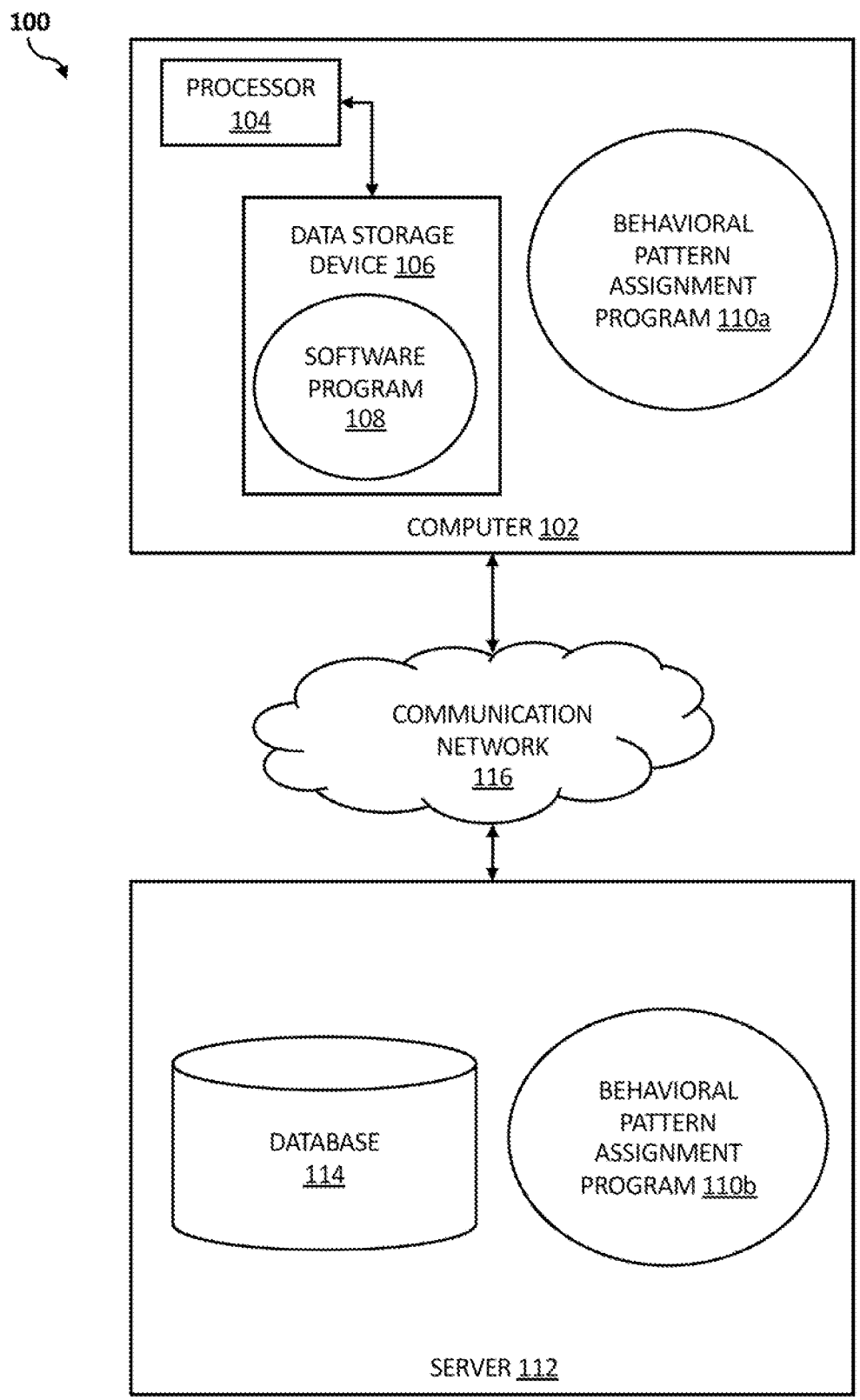
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for using computer vision/deep learning against generated historical timeline images on target focal objects (e.g., customers or accounts) to predict labeled behavioral similarities. As such, the present embodiment has the capacity to improve the technical field of deep event vision by implementing unsupervised image clustering into the timeline labeling process to reduce the time to fully implement the cognitive system and converge the results while reducing error in the predicted labeled behavioral similarities. More specifically, a behavioral pattern assignment program may implement unsupervised machine learning to cluster historical timeline images representing transactions associated with target objects. In one embodiment, the historical timeline images may also include event markers that represent events in addition to transactions. Then, the behavioral pattern assignment program may receive labels for the historical timeline image clusters. Next, the behavioral pattern assignment program may implement supervised machine learning and use the labeled historical timeline image clusters to train a machine learning model that detects behavioral patterns in current transaction timeline images.

As described previously, predicting human behavior can be extremely difficult, but it can also be very useful for a wide variety of purposes such as business, financial, and law enforcement. One example that spans all of these areas is fraud detection. Fraud detection has become a special form of technology. Some of the most common applications of fraud detection are for credit card fraud, bank fraud, medical fraud, welfare fraud, and insurance fraud. The stakes in these areas are extremely high. A recent study showed that merchants in the United States alone lost nearly 200 billion dollars in a single year to credit card fraud.

Fraud appears in many different forms and the detection of fraud relies on a system with the capability to recognize or discover these fraudulent activities/events. Events occur within time and space, usually at predictable occurrences. This allows traditional fraud detection logic to build fixed rules according to the particular circumstances to recognize potential fraud and flag it for further review. More advanced approaches to fraud detection may be implemented using cognitive technology.

A cognitive system (which may sometimes be referred to as deep learning, deep thought, or deep question answering) may include a form of artificial intelligence that uses machine learning and problem solving. In one embodiment, cognitive systems may employ various types of neural networks. A feedforward neural network may include an artificial neural network where connections between the units do not form a cycle. In feedforward neural networks, information moves in only one direction, forward, from the input nodes, through the hidden nodes (if any) and to the output nodes. A convolution neural network is a specific type of feedforward neural network made up of neurons that have learnable weights and biases.

Feedforward neural networks do not include cycles or loops, which is different from recurrent neural networks. A recurrent neural network is a type of artificial neural network where connections between units form a directed cycle. This creates an internal state of the network which allows it to exhibit dynamic temporal behavior. Unlike feedforward neural networks, recurrent neural networks can use their internal memory to process arbitrary sequences of inputs.

One alternative to the use of neural networks for machine learning includes support vector machine (SVM). An SVM may be implemented to construct a multidimensional mathematical space based on training examples and may provide a boundary in that space that allows for binary classification of an input, e.g., as a "good" answer versus a "bad" answer. Another alternative to the use of neural networks involves Bayesian networks which represent a set of variables with a directed acyclic graph. The Bayesian network may then be used to compute probabilistic relationships between variables.

A cognitive system of the present disclosure may not be limited to the use of a single approach may incorporate any number of the machine learning algorithms described above. In one embodiment, these algorithms may produce a score or confidence value indicating the likelihood that a particular answer (e.g., behavioral pattern label) is correct.

Conventional behavior prediction techniques may be used to identify behavior patterns from a target focal object's (e.g., customer; account) recent transactions or other events. System designers are, however, continually searching for different ways to model behavior that can provide different perspectives for extracting patterns from the data. One problem in this search is that transaction histories often vary substantially in nature and size, making it hard to find a consistent manner of using these histories to either create a prediction model.

Therefore, it may be advantageous to, among other things, provide a way to identify a behavior pattern from a series of transactions which could be applied to a variable number of transaction types and sizes over any relevant time frame. It may be further advantageous to provide a way to recognize behavior patterns using understanding gained in a manner other than from purely numerical transaction analysis. Accordingly, it may be advantageous to enable creating a timeline of transactions of a focal object (e.g., customers; accounts), or any measured sequence of events, and converting the data points into annotated timeline images which may be labeled for training a predictive image recognition deep learning model. In one embodiment, converting the transaction timeline to a graphic image may address issues associated with variable transaction history sizes and may improve the classification of behavioral similarities. It may also be advantageous to implement unsupervised machine learning techniques to automatically cluster the timeline images to accelerate the timeline labeling process to reduce the time to fully implement the predictive image recognition deep learning model.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a behavioral pattern assignment (BPA) program 110*a*. The networked computer environment 100 may also include a server 112 that is enabled to run a BPA program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 9, server computer 112 may include internal components 902*a* and external components 904*a*, respectively, and client computer 102 may include internal components 902*b* and external components 904*b*, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the BPA program 110*a*, 110*b* may interact with a database 114 that may be embedded in various storage devices, such as, but not limited to a computer/mobile device 102, a networked server 112, or a cloud storage service.

According to the present embodiment, a user using a client computer 102 or a server computer 112 may use the BPA program 110*a*, 110*b* (respectively) to perform unsupervised image clustering of generated customer transaction timeline images to efficiently label the transaction timeline image clusters to train a model to predict transaction behaviors. Embodiments of the present disclosure are explained in more detail below with respect to FIGS. 2 to 8.

Figure 2:
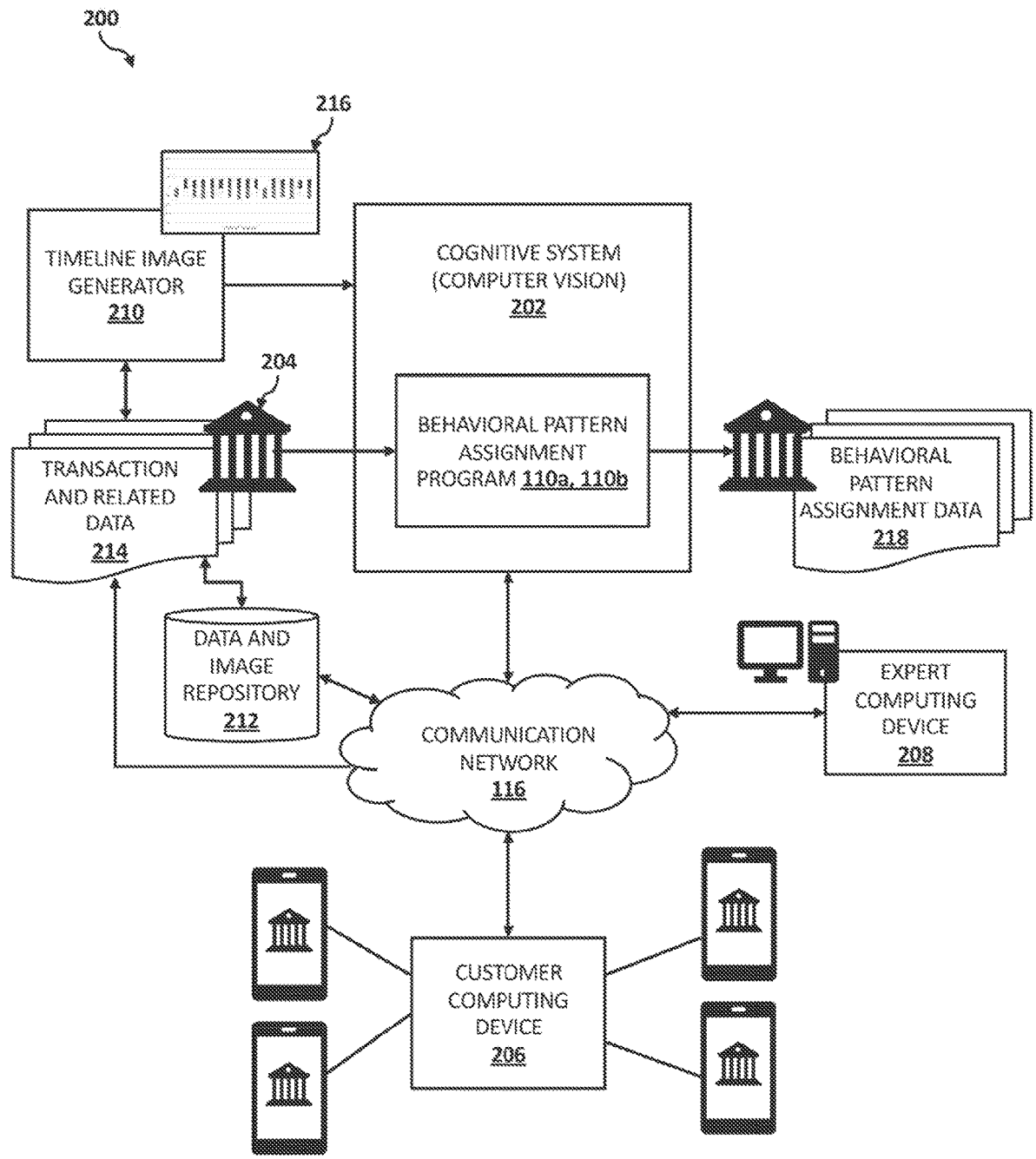
FIG. 2 is a schematic block diagram of a transaction monitoring environment according to at least one embodiment.

Referring now to FIG. 2, a schematic block diagram of a transaction monitoring environment 200 implementing the BPA program 110a, 110b according to at least one embodiment is depicted. According to one embodiment, the transaction monitoring environment 200 may include one or more components (e.g., client computer 102; server computer 112; communication network 116) of the computer environment 100 discussed above with reference to FIG. 1.

According to one embodiment, the transaction monitoring environment 200 may include a cognitive system 202, one or more financial institutions 204 (e.g., which may refer to computer systems associated with the financial institution), one or more customer computing devices 206, one or more expert computing devices 208, a timeline generator 210, and a data and image repository 212, which may all be linked through the communication network 116. In various embodiments, the cognitive system 202, the computing systems associated with the one or more financial institutions 204, the one or more customer computing devices 206, the one or more expert computing devices 208, and the timeline generator 210 may include a workstation, a personal computing device, a laptop computer, a desktop computer, a thin-client terminal, a tablet computer, a smart telephone, a smart watch or other smart wearable, or other electronic devices.

In various embodiments, the data and image repository 212 may be distributed over multiple data storage devices (e.g., data storage device 106; database 114) included in the electronic devices (e.g., cognitive system 202; financial institution 204) of the transaction monitoring environment 200, over multiple data storage devices (e.g., data storage device 106; database 114) external to the electronic devices (e.g., cognitive system 202; financial institution 204) of the transaction monitoring environment 200, or a combination thereof. In other embodiments, data and image repository 212 may be remote, such as on another server available via communication network 116.

According to one embodiment, cognitive system 202 may include a tangible storage device and a processor that is enabled to run the BPA program 110a, 110b. In one embodiment, the BPA program 110a, 110b may include a single computer program or multiple program modules or sets of instructions being executed by the processor of the cognitive system 202. The BPA program 110a, 110b may include routines, objects, components, units, logic, data structures, and actions that may perform particular tasks or implement particular abstract data types. The BPA program 110a, 110b may be practiced in distributed cloud computing environments where tasks may be performed by remote processing devices which may be linked through the communication network 116. In one embodiment, the BPA program 110a, 110b may include program instructions that may be collectively stored on one or more computer-readable storage media.

According to one embodiment, the customer computing device 206 may be associated one or more focal objects (e.g., customers of financial institution 204; accounts registered with financial institution 204) of the transaction monitoring environment 200. The terms focal objects, customers, and accounts may be used interchangeably throughout this disclosure. In one embodiment, the computer system (e.g., may be physically located in the institution or may be a remote server accessible via communication network 116) associated with the financial institution 204 may generate records of transactions associated with the focal objects. Transactions may include, without limitations, transactions between the customer computing device 206 and the financial institution 204 and/or internal transactions of the financial institution 204 associated with the customer. These transaction records may be stored in the data and image repository 212 as one or more transaction and related data 214.

According to one embodiment, a customer may include an individual, a legal entity (e.g., a company or business), or a department of one of the financial institutions. The nature of the transactions associated with the transaction and related data 214 may vary considerably depending on the specific application. In an exemplary application where the financial institution 205 is a bank, the transaction and related data 214 may be associated with a customer's checking or savings account. These details should not, however, be considered limiting as various embodiments may be implemented for any type of transactions or accounts.

According to one embodiment, the transaction and related data 214 may be processed to generate a transaction history (e.g., transactions over a period of time) for a given customer's interactions with one of the financial institutions 204. In some embodiments, data from multiple financial institutions 204 transacting with the given customer may be aggregated to generate the transaction history. The relevant period of time indicated by the transaction history may vary considerably (e.g., days, months; years) according to system designer preferences, expert input, or time frames associated with particular transaction types. In the illustrative embodiments, each transaction (e.g., event) may include information, such as, for example, a transaction amount, a transaction date, and a transaction type.

Advanced cognitive systems, such as, the cognitive system 202, may be implemented to detect patterns in various data which human detection may fail to recognize. The disclosed embodiments take advantage of this ability by providing a novel technique for representing the transaction information to leverage the computer vision capabilities of cognitive system 202. Computer vision is a field of artificial intelligence directed to training machine learning models to interpret and understand the visual world. Where conventional methods for transaction analysis, such as fraud detection, may rely on numerical and textual approaches (e.g., analyzing structured data), the disclosed embodiments instead utilize a graphical approach where the transaction history is transformed into a transaction timeline image 216 by the timeline generator 210.

In one embodiment, this process may include the timeline generator 210 creating a graphic image (e.g., chart, graph, pictorial diagram, preferably with colors) representing a timeline for the transaction history based on receiving the transaction and related data 214. Then, the cognitive system 202 may receive the transaction timeline images 216 and analyze the transaction history represented by the transaction timeline image 216 to determine a behavior pattern classification for the transactions. More specifically, the cognitive system 202 may execute the BPA program 110a, 110b to output one or more BPA data 218. In one embodiment, the BPA data 218 may be transmitted to financial institution 204.

According to at least one embodiment, the BPA data 218 may include a label classifying the behavioral pattern detected based on the transaction timeline images 216. If the cognitive system 202 returns a label which indicates potentially criminal activities by the customer/account (e.g., fraud), appropriate action may be taken, such as generating a suspicious activity report for review by a system supervisor. In one embodiment, the supervisor may determine whether to escalate the matter and/or transmit the information to the particular financial institution 204 involved. In some implementations, responsive actions may be taken automatically by the cognitive system 202 based on the alert (e.g., suspicious activity report).

According to one embodiment, the pattern recognition capabilities of cognitive system 202 may be implemented by training a machine learning model using supervised learning. In supervised learning, machine learning models may be trained using labeled data. In the present disclosure, the labeled data may include transaction timeline images 216 annotated with behavioral pattern labels (e.g., fraud, small business, student). Labeled training data may typically be generated by a subject matter expert (SME) in the associated domain. For example, in embodiments where the transaction timeline image 216 may represent training data, the timeline image generator 210 may transmit the unlabeled transaction timeline image 216 to the expert computing device 208 for review by the SME. The SME may analyze the transaction timeline image 216 and assign a label based on the transaction history. The labeled transaction timeline image 216 may then be fed into the cognitive system 202 to train and test the machine learning model using supervised learning. One limitation of supervised learning is the availability of large sets of labeled data. Labeled datasets, such as, for example, labeled transaction timeline images 216 may be expensive, time consuming, and/or difficult to generate using SMEs analyzing one transaction timeline image 216 at a time. Therefore, the present embodiments provide a process for clustering the transaction timeline images 216 into groups using unsupervised machine learning. The clustered transaction timeline images 216 may then be provided to SMEs for review and group labeling. By leveraging unsupervised learning to pre-cluster the transaction timeline images 216 based on similar image properties, and enabling SMEs to label entire groups of transaction timeline images 216 instead of individual transaction timeline images 216, the cognitive system 202 may be fully implemented faster with less error.

Figure 3:
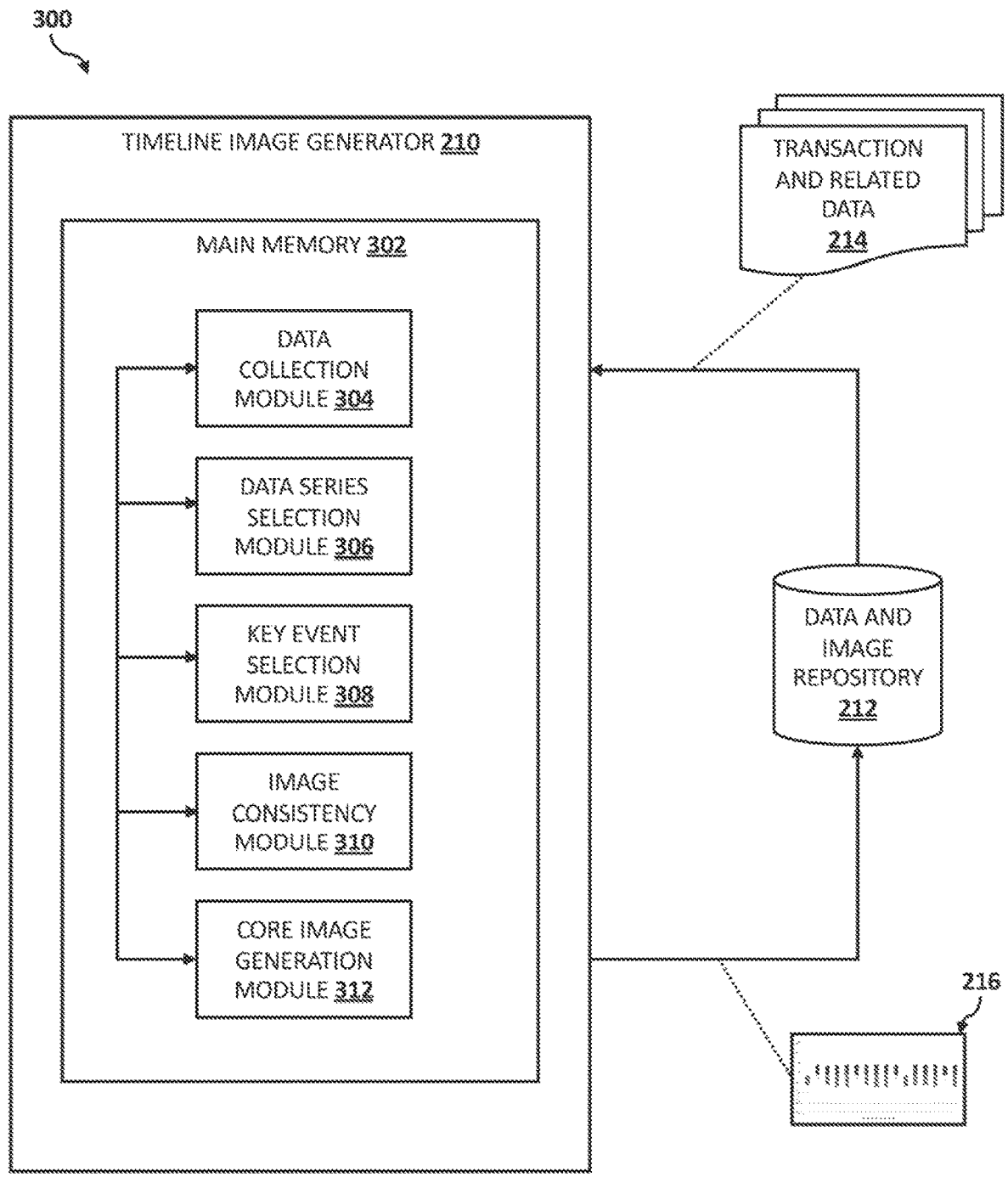
FIG. 3 is block diagram of a timeline generator according to at least one embodiment.

Referring now to FIG. 3, a block diagram 300 of timeline generator 210 according to at least one embodiment is depicted.

As briefly described with reference to FIG. 2, the timeline image generator 210 may receive transaction and related data 214 associated with customers of the financial institution 204 and generate transaction timeline images 216 representing the transaction history associated with customers of the financial institution 204. In one embodiment, the data and image repository 212 may store the transaction and related data 214 (e.g., input for the timeline image generator 210) and the generated transaction timeline images 216 (e.g., output of the timeline image generator 210). In other embodiments, the transaction and related data 214 and the generated transaction timeline images 216 may be stored in any suitable storage device.

According to one embodiment, the timeline image generator 210 may include a single computer program or multiple program modules or sets of instructions being executed by the processor of the computer system associated with the timeline image generator 210. In the illustrated embodiment, the timeline image generator 210 may include a main memory 302 storing multiple program modules, such as, for example, a data collection module 304, a data series selection module 306, a key event selection module 308, an image consistency module 310, and a core image generation module 312. According to one embodiment, the data collection module 304 may be implemented to access the data and image repository 212 and retrieve customer data (e.g., transaction and related data 214) for further processing. The core image generation module 312 may be implemented to generate the final transaction timeline image 216 based on the processing by the data series selection module 306, the key event selection module 308, and the image consistency module 310, which will be further detailed with reference to FIGS. 4-6.

Figure 4:
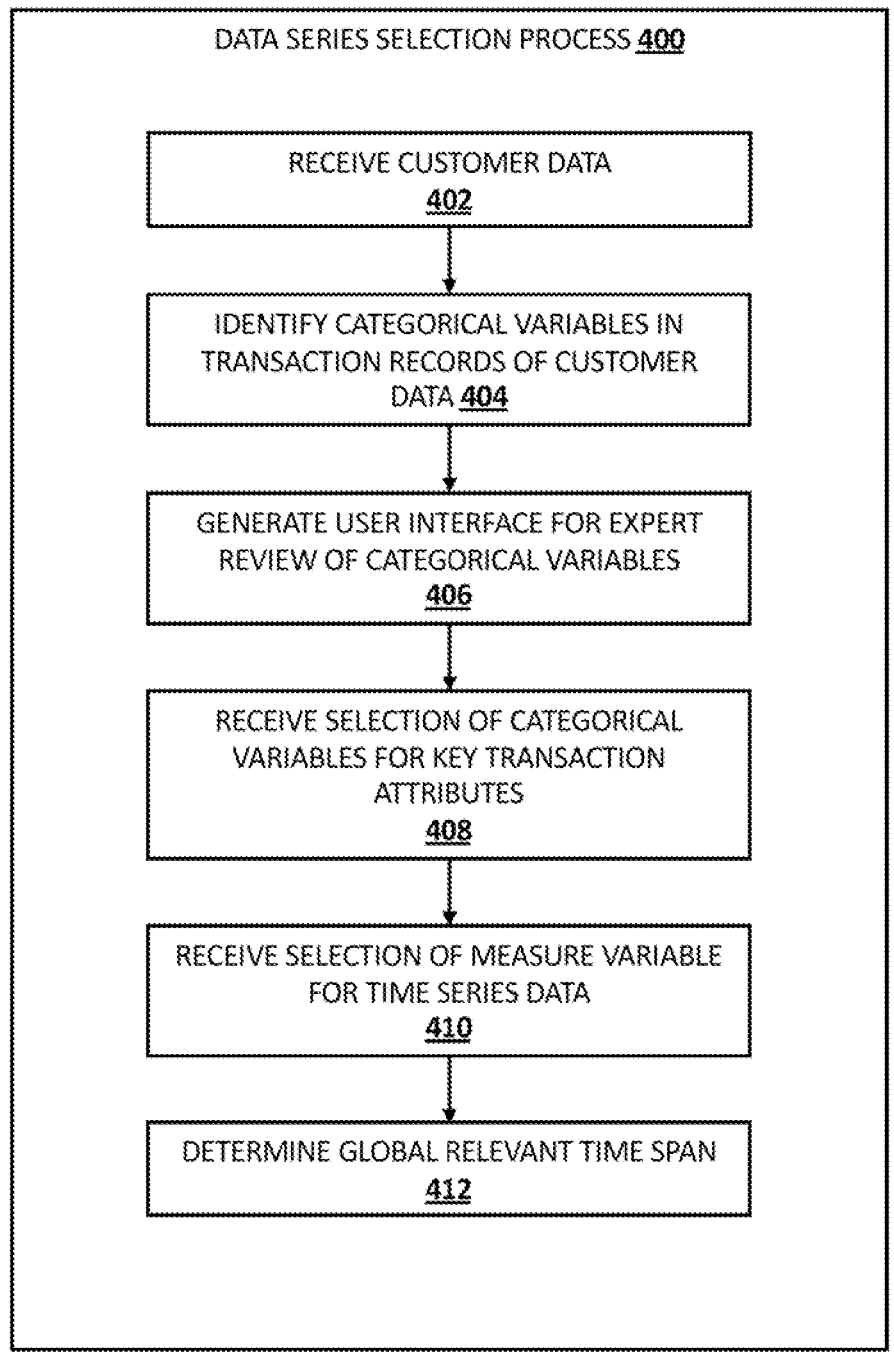
FIG. 4 is an operational flowchart illustrating a process for data series selection according to at least one embodiment.

Referring now to FIG. 4, an operational flowchart illustrating the exemplary data series selection process 400 used by the data series selection module 306 of the timeline image generator 210 according to at least one embodiment is depicted.

At 402, customer data is received. As previously described, the data collection module 304 may be implemented to access the data and image repository 212 and retrieve customer data (e.g., transaction and related data 214) for further processing by the timeline image generator 210.

Then at 404, one or more categorical variables are identified in the transaction records of customer data. According to one embodiment, the categorical variables may refer to various transaction types identified in the transaction records by the data series selection module 306. In one example where the financial institution 204 is a bank, the transaction types may include cash deposit transactions, cash withdrawal transactions, debit card transactions, point-of-sale transactions, wire transactions, in-bank to bank transfer transactions, in-bank transfer transactions, automated clearing house transfer transactions, and check deposit transactions. In other embodiments, any suitable types of transactions may be identified by the data series selection module 306.

Then at 406, a user interface (UI) is generated for expert review of the categorical variables. As noted above, the data series selection module 306 may identify various transaction types in the transaction records. However, not all of the transaction types may be relevant to classifying the behavioral pattern of the customer. As such, the data series selection module 306 may generate a UI to enable expert review of the identified categorical variables to determine which of the transaction types may be key to classifying the behavioral pattern and which of the transaction types may be noise. In one embodiment, the UI may include a graphical user interface (GUI) which the SME may interact with (e.g., via a touchscreen, a keyboard, a cursor-control device (e.g., a mouse, a touchpad, a stylus), one or more buttons, a microphone, a speaker, and/or a display of the expert computing device 208) to review and select the key categorical variables (e.g., transaction types).

Then at 408, a selection of categorical variables for key transaction attributes are received. According to one embodiment, the data series selection module 306 may receive the categorical variables for key transaction attributes responsive to the SME interacting with the expert computing device 208 to review and select the key categorical variables from all the categorical variables identified by the data series selection module 306.

Then at 410, a selection of measure variables for time series data is received. According to one embodiment, a measure variable may be associated with how a transaction may be quantified (e.g., monetary; frequency). In one embodiment, the measure variable may be indicated on an axis (e.g., y-axis) using positive and negative values. For example, the measure variable may indicate cash inflow using positive currency values and may indicate cash outflow using negative currency values. In one embodiment, the SME may interact with the GUI generated by the data series selection module 306 to select the measure variable for the transaction timeline image 216.

Then at 412, a global relevant time span is determined. According to one embodiment, the relevant time span may be used to determine whether transaction information has been accumulated over a sufficiently long period of time to enable a substantive transaction history. The relevant time span may range from a few weeks to a year or more, depending on the type of transactions being monitored. A global relevant time span may be determined to normalize the timelines for all the customers to a common time scale.

Figure 5:
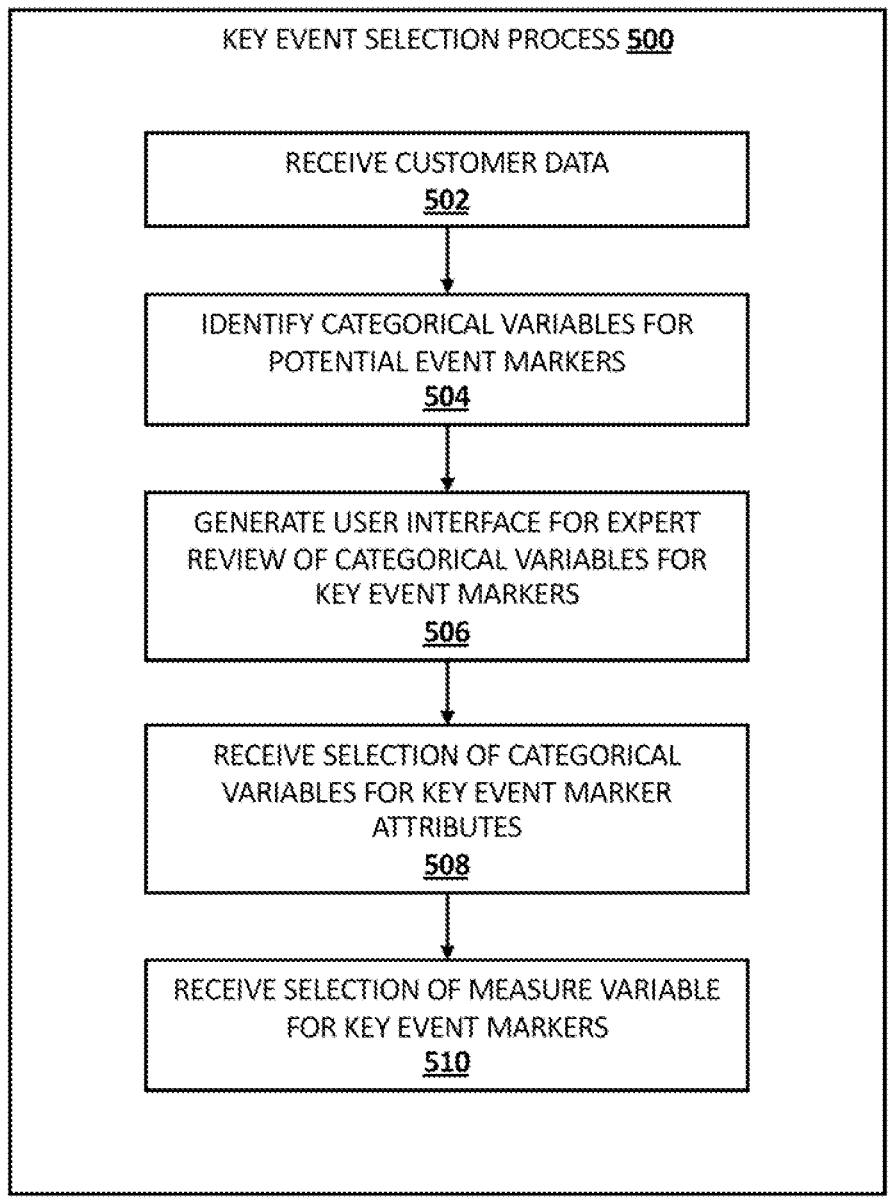
FIG. 5 is an operational flowchart illustrating a process for key event selection according to at least one embodiment.

Referring now to FIG. 5, an operational flowchart illustrating the exemplary key event selection process 500 used by the key event selection module 308 of the timeline image generator 210 according to at least one embodiment is depicted.

At 502, customer data is received. According to one embodiment, the timeline generator 210 may have access to external data sources (e.g., in addition to transaction and related data 214) which may provide information that may be salient to determining customer behavioral patterns.

At 504, categorical variables for potential external markers are identified. According to one embodiment, the key event selection module 308 may identify these categorical variables in the external data sources. In one embodiment, the key event selection module 308 may identify external markers from public and/or private sources of information. Examples of customer external markers may include, without limitations, marital status, employment status, bankruptcy filing, excess cash inflow (e.g., lottery), major purchases (e.g., home, auto), student status (e.g., enrollment, graduation). Other external markers may also include, for example, geographic markers (e.g., draught, flooding, other natural disasters) and sociopolitical markers (e.g., riots, infrastructure changes). In one embodiment, these external markers may be added into the transaction timeline image 216 to improve pattern detection.

At 506, a UI is generated for expert review of categorical variables for key event markers. As noted above, the key event selection module 308 may identify various external markers. However, not all of the external markers may be relevant to classifying the behavioral pattern of the customer. As such, the key event selection module 308 may enable an SME to interact with a GUI to review and select the key event markers.

Then at 508, a selection of categorical variables for key event markers are received. According to one embodiment, the key event selection module 308 may receive the categorical variables for key event markers responsive to the SME interacting with the expert computing device 208 to review and select the key event marks from all the external markers identified by the key event selection module 308.

Then at 510, a selection of measure variables for key event markers are received. According to one embodiment, a measure variable may be associated with how a key event marker may be quantified (e.g., monetary; frequency). In one embodiment, the measure variable may be indicated on an axis (e.g., y-axis) using positive and negative values. In one embodiment, the measure variable may be indicated the axis by the frequency of the event. For example, the measure variable for a car or house purchasing event may indicate the purchase price. In one embodiment, the SME may interact with the GUI generated by the key event selection module 308 to select the measure variables for the key event markers.

Figure 6:
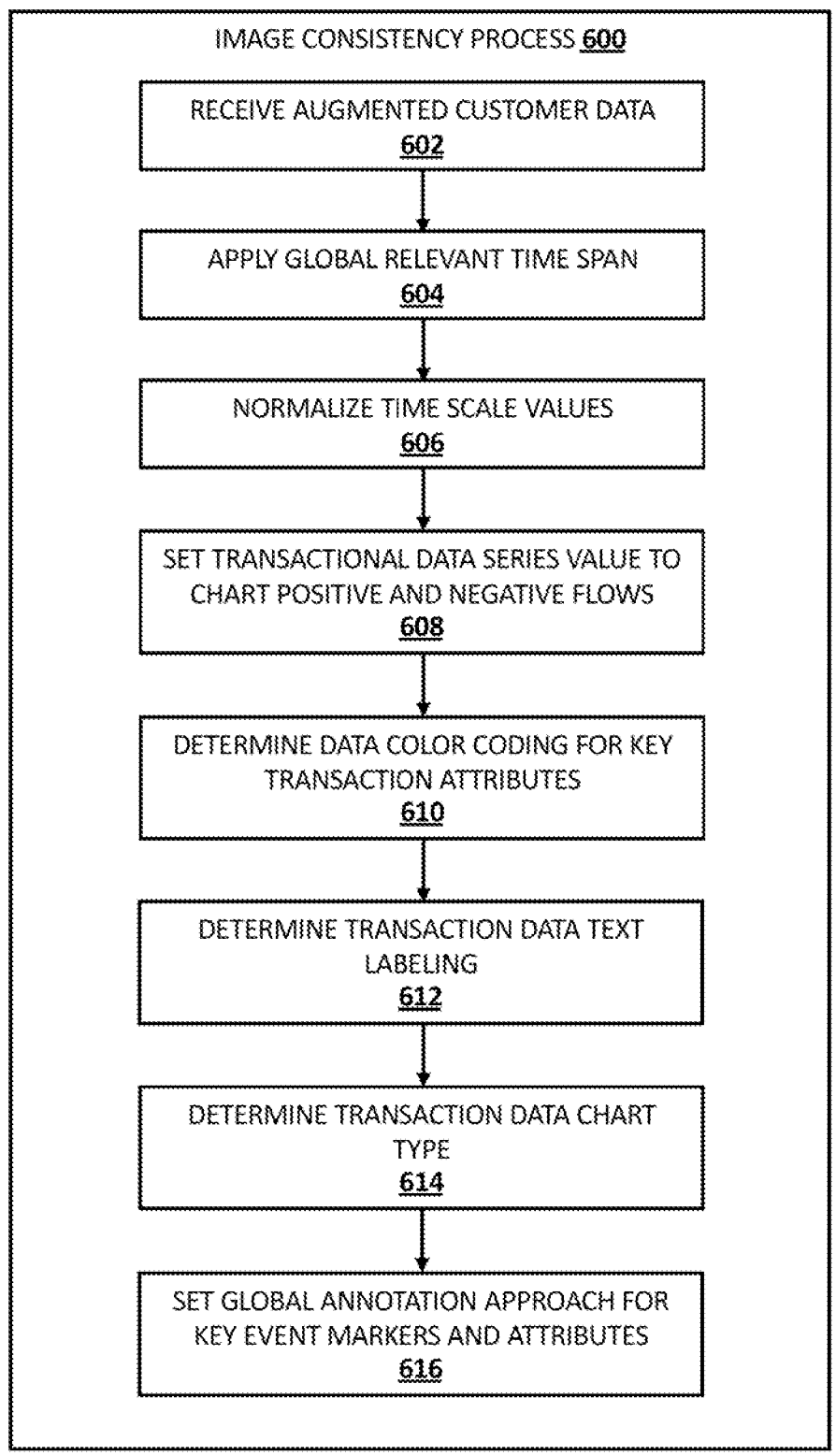
FIG. 6 is an operational flowchart illustrating a process for image consistency according to at least one embodiment.

Referring now to FIG. 6, an operational flowchart illustrating the exemplary image consistency process 600 used by the image consistency module 310 of the timeline image generator 210 according to at least one embodiment is depicted.

At 602, augmented customer data is received. According to one embodiment, the augmented customer data may be the data received by the image consistency module 310 once the customer data has been processed by the data series selection module 306 and the key event selection module 308. In one embodiment, the augmented customer data may be used for generating the transaction timeline image 216.

Then at 604, a global relevant time span is applied. As previously noted, the relevant time span may be used to determine whether transaction information has been accumulated over a sufficiently long period of time to enable a substantive transaction history. In order to enable accurate comparisons between various transaction timeline images 216, the image consistency module 310 may set a global relevant time span.

Next at 606, the time scale values are normalized. According to one embodiment, the image consistency module 310 may normalize the timelines in such a way that variable-size transaction histories become easier to compare. As noted above, normalizing may include fixing the timeline to a common time scale. If the current timeline is unusually short then blank space may be added to fill in the relevant time period, or if the current timeline is longer than necessary it may be cropped.

Then at 608, the transactional data series values are set to chart positive and negative flows. As described previously, a measure variable may be associated with how a transaction may be quantified (e.g., monetary; frequency). In one embodiment, the measure variable may be indicated on an axis (e.g., y-axis) using positive and negative values. For example, the measure variable may indicate cash inflow using positive currency values and may indicate cash outflow using negative currency values.

Then at 610, data color coding for key transaction attributes are determined. According to one embodiment, the graphic representations in the transaction timeline image 216 may be color-coded according to the transaction types. In one embodiment, the image consistency module 310 may assign a global color for each transaction type. For example, cash deposits may be green, cash withdrawals may be red, signature debit card transactions may be pink, and point-of-sale transactions may be blue. In various embodiments, color coding may also include shades of gray and pattern fills (e.g., cross-hatching)

Then at 612, transaction data text labeling is determined. According to one embodiment, the transaction timeline images 216 may also include non-graphic annotations, such as, texts for labeling one or more of the transactions. In one embodiment, this information may be in the form of various metadata associated with the timeline. Examples of annotations may include, without limitations, "periodic," "large cash withdrawal," "large cash deposit," and "structured cash deposit."

Next at 614, the transaction data chart type is determined. According to one embodiment, any translation of a transaction timeline into a graphic image may be used. In one embodiment, a bar chart may be used. Similarly, other charts besides bar charts may also be used, such as, for example, stacked bar, pie, line, area, or surface charts.

Thereafter at 616, the global annotation approach for key event markers and attributes are set. As previously described, external markers may be added into the transaction timeline image 216 to improve pattern detection. In order to maintain consistency across all transaction timeline images 216, each key event marker may be assigned a global annotation. For example, a car purchase event marker may be indicated by a red box, a house closing may be indicated by a blue box, and lottery winnings may be indicated by a green box.

Figure 7:
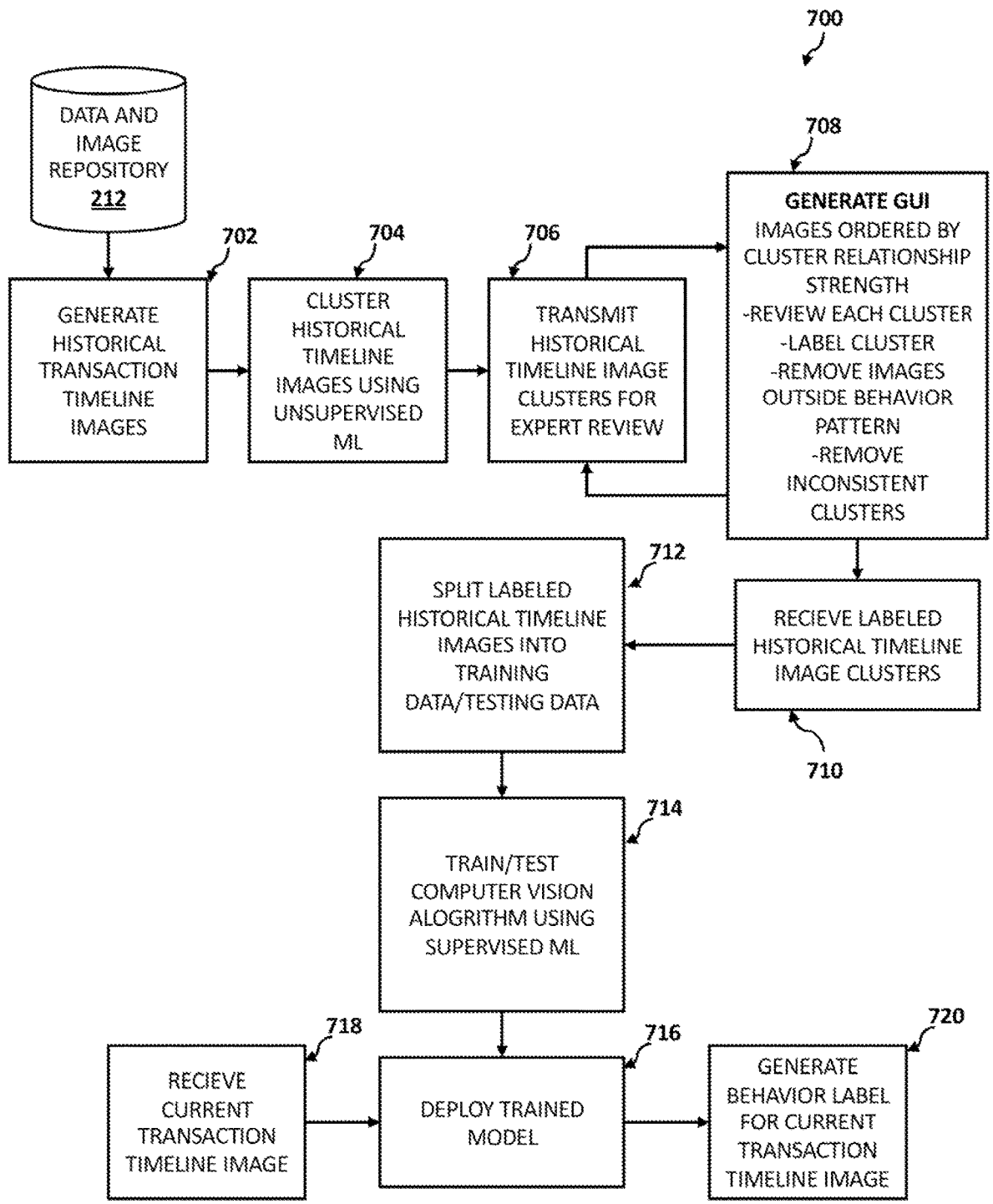
FIG. 7 is an operational flowchart illustrating a process for behavioral pattern assignment with image clustering according to at least one embodiment.

Referring now to FIG. 7, an operational flowchart illustrating the exemplary behavioral pattern assignment with image clustering process 700 used by the BPA program 110a, 110b of the cognitive system according to at least one embodiment is depicted.

According to one embodiment, the data and image repository 212 may store the transaction and related data 214, which may be used as input data for the timeline image generator 210 to generate one or more transaction timeline images at 702, as previously described with reference to FIGS. 3-6. In one embodiment, the transaction timeline images may include a large number of historical transaction timeline images generated by the timeline image generator 210 for training the cognitive system.

Then at 704, the historical transaction timeline images are clustered using unsupervised machine learning. As described previously, it may be advantageous to implement unsupervised machine learning techniques to automatically cluster the generated transaction timeline images to accelerate the timeline labeling process to reduce the time to fully implement the predictive image recognition deep learning model.

According to one embodiment, the generated historical transaction timeline images may be divided into several groups based on similar image features (e.g., portions of the historical transaction timeline images). Various clustering algorithms may be implemented, such as, for example, k-means clustering, mean shift clustering, density-based spatial clustering, and hierarchical clustering.

Then at 706, the historical transaction timeline image clusters are transmitted for expert review. According to one embodiment, the clustered historical transaction timeline images may be provided to SMEs (e.g., transmitted to expert computing device 208) for review and group labeling.

Next at 708, a GUI is generated to enable expert review of the clustered historical transaction timeline images. According to one embodiment, the GUI may include the clustered historical transaction timeline images ordered by cluster relationship strength. According to one embodiment, the cluster relationship strength may indicate how strongly related a given historical transaction timeline image is compared to the historical transaction timeline images at the center of the image cluster.

In one embodiment, the GUI may prompt the SME to review and label each cluster of images. According to one embodiment, the SME may be enabled to input a wide variety of labels depending on the nature of the transactions and the purpose behind the analysis. For example, the labels "Money Laundering" or "Not Money Laundering" may be used to classify transactions in the banking industry, or as either "Fraud" or "Not Fraud" in the insurance industry. Other labels may also include "Student," "International Student," "Shell Company," "Hospital," "Large Corporation," "Small Business," "Casino," or any other business types. All of these labels are exemplary and should not be construed in a limiting sense as any behavior type or entity classification may be identified by the SME. According to one embodiment, once a cluster of images are labeled by the SME, each of the historical transaction timeline images within that cluster may be annotated with that same label. By enabling SMEs to label entire groups of transaction timeline images, instead of individual transaction timeline images, the cognitive system may be fully implemented faster with less error.

In another embodiment, the GUI may prompt the SME to remove transaction timeline images that may be inaccurately clustered outside of the behavior pattern. According to one embodiment, the SME may review each transaction timeline image in each cluster and may determine, after further review of the transactions and/or event markers, that one or more of the transaction timeline images were not clustered properly. For example, the SME may remove a transaction timeline image from the potential "Money Laundering" cluster because further review may indicate that the transactions represent that of an "International Student." In various embodiments, the GUI may enable the SME to remove an inconsistent cluster and assign the transaction timeline images within the inconsistent cluster to one of the other accurate clusters.

Then at 710, labeled historical transaction timeline image clusters are received. According to one embodiment, the labeled historical transaction timeline image clusters may be received from the expert computing device 208 once the SME has completed the cluster labeling process discussed at 708.

Next at 712, the labeled historical transaction timeline images are split into training data and testing data. According to one embodiment, the training data may include a subset of the labeled historical transaction timeline images for training a supervised machine learning algorithm. In one embodiment, the testing data may include a subset of the labeled historical transaction timeline images for testing the trained model. In one embodiment, the training data may account for approximately 80% of the labeled historical transaction timeline images dataset and the testing data my account for approximately 20% of the labeled historical transaction timeline images dataset. In other embodiments, any suitable ratio of training data to testing data may be implemented.

Then at 714, a computer vision algorithm (e.g., image recognition model) is trained and tested using supervised machine learning. According to one embodiment, the cognitive system may perform supervised machine learning training by ingesting the training data (e.g., labeled historical transaction timeline images) and learning an image recognition model that can associate the historical transaction timeline images to the respective behavioral pattern labels. In one embodiment, the trained model may then be applied to the test data (e.g., historical transaction timeline images without the labels) to evaluate how successful the trained model is at assigning the correct behavioral pattern labels. According to one embodiment, the cognitive system may determine the accuracy of the trained model by calculating an Fi score based on the precision and recall of the trained model. For example, the number of true positive results (e.g., transaction timeline image with correct label match) and false positive results (e.g., transaction timeline image with incorrect label match) may be balanced to determine whether the target accuracy of the trained model was achieved. In embodiments where the target accuracy has not been achieved, the cognitive system may tune one or more hyperparameters of the trained model to improve the accuracy of the results.

Next at 716, a trained model is deployed. According to one embodiment, the cognitive system may deploy the trained model (e.g., image recognition model) capable of classifying behavioral patterns learned from the historical transaction timeline images.

Then at 718, a current transaction timeline image is received. According to one embodiment, the current transaction timeline image may be generated by the timeline image generator 210, as previously described with reference to FIGS. 3-6, and fed into the cognitive system. According to one embodiment, the current transaction timeline image may include the same type of image and global color-coding scheme as used in the training/testing process described above.

Thereafter at 720, a behavioral pattern label is generated for the current transaction timeline image. According to one embodiment, the cognitive system may match the current transaction timeline image to the behavioral patterns learned from the historical transaction timeline images (e.g., known behavioral patterns) and assign a corresponding label to the current transaction timeline image. According to one embodiment, the cognitive system may enable the SME to review a sample of the results to determine whether they agree with the recommendations coming from the deployed model. The cognitive system may also provide a mechanism in the UI to allow the SME or other system engineer to use the current transaction timeline image with an assigned label for additional training, e.g., to update the cognitive system.

According to one embodiment, if the detected behavior pattern at 720 is malicious, the cognitive system may transmit an alert/flag of the transaction activity to a supervisor (e.g., at financial institution 204). According to one embodiment, other actions may be taken, such as, for example, transmitting a notification (suspicious activity reporting), a denial of privileges (e.g., suspending a credit card account), or transmitting a challenge (e.g., sending a text message to a mobile electronic device associated with an owner of an account).

Figure 8:
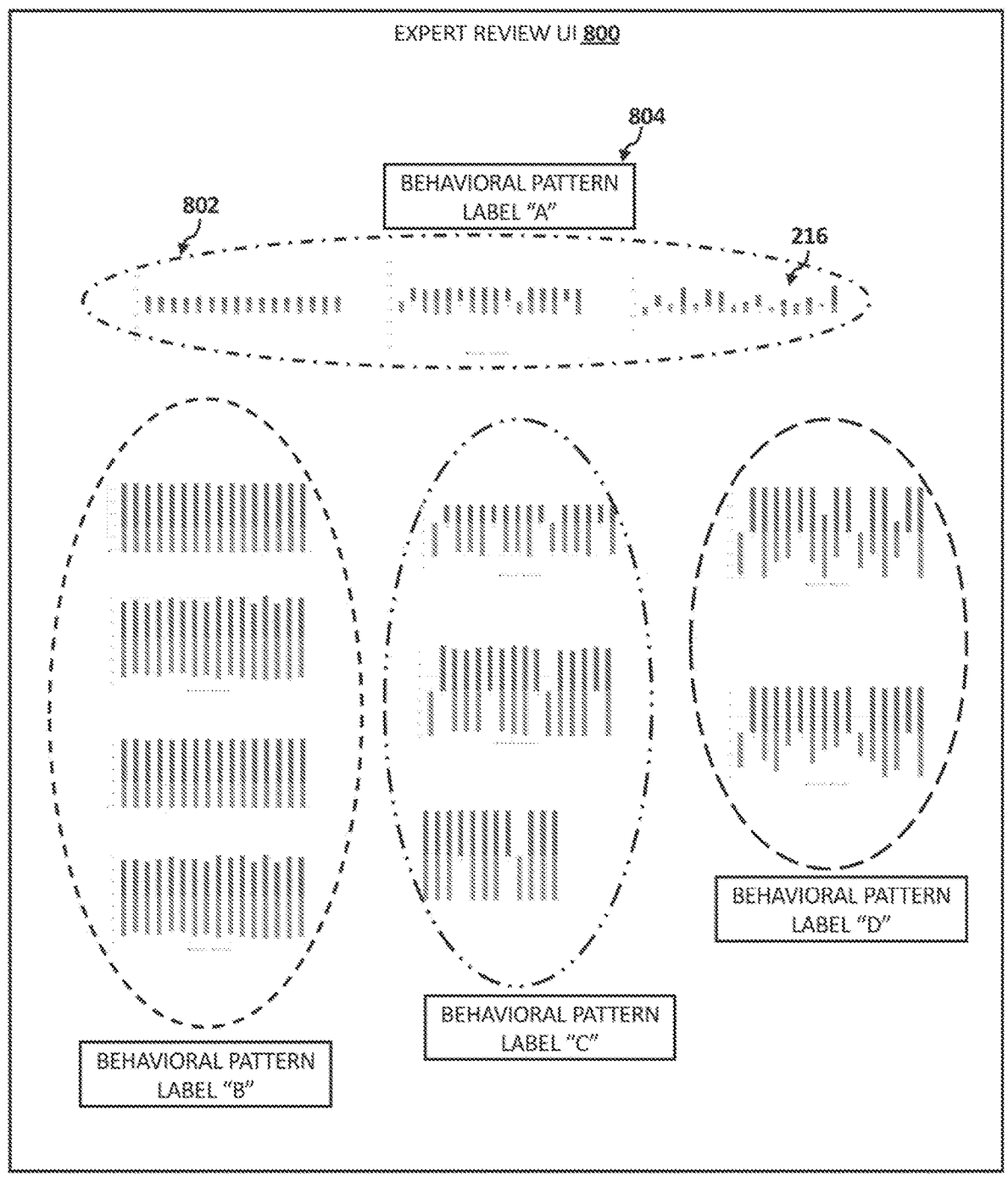
FIG. 8 is a block diagram illustrating an exemplary expert review user interface according to at least one embodiment.

Referring now to FIG. 8, a block diagram illustrating the exemplary expert review UI 800 used by the BPA program 110a, 110b according to at least one embodiment is depicted.

According to one embodiment, the cognitive system may implement unsupervised machine learning to generate one or more transaction timeline image clusters 802. Each transaction timeline image cluster 802 may include one or more transaction timeline images 216 generated by the timeline image generator 210, as previously described.

According to one embodiment, the cognitive system may generate the expert review UI 800 to enable SMEs to review each transaction timeline image cluster 802 and input a corresponding behavioral pattern label 804. In one embodiment, the expert review UI 800 may include tools to enable the SME to label each cluster 802, remove transaction timeline images 216 which may fall outside of the transaction timeline image cluster 802, and remove inconsistent transaction timeline image clusters 802, as previously described.

The BPA program 110a, 110b may improve the functionality of a computer because the BPA program 110a, 110b may enable the computer to implement unsupervised machine learning techniques to automatically cluster transaction timeline images to accelerate the timeline image labeling process to reduce the time to fully implement the predictive image recognition deep learning model.

It may be appreciated that FIGS. 2 to 8 provide only an illustration of one embodiment and do not imply any limitations with regard to how different embodiments may be implemented. Many modifications to the depicted embodiment(s) may be made based on design and implementation requirements.

Figure 9:
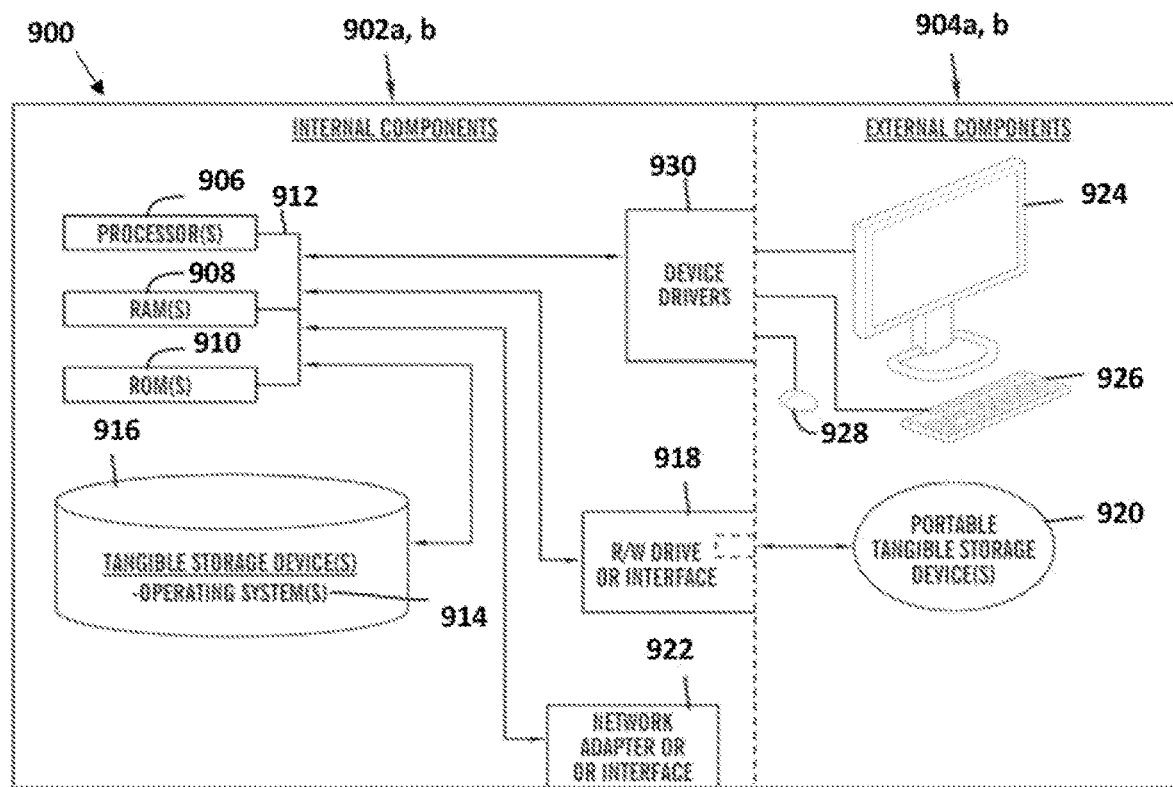
FIG. 9 is a block diagram of internal and external components of computers and servers depicted in FIG. 1 according to at least one embodiment.

FIG. 9 is a block diagram 900 of internal and external components of computers depicted in FIG. 1 in accordance with an illustrative embodiment of the present invention. It should be appreciated that FIG. 9 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 9. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the BPA program 110a in client computer 102, and the BPA program 110b in network server 112, may be stored on one or more computer-readable tangible storage devices 916 for execution by one or more processors 906 via one or more RAMs 908 (which typically include cache memory). In the embodiment illustrated in FIG. 9, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the BPA program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the BPA program 110a in client computer 102 and the BPA program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the BPA program 110a in client computer 102 and the BPA program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
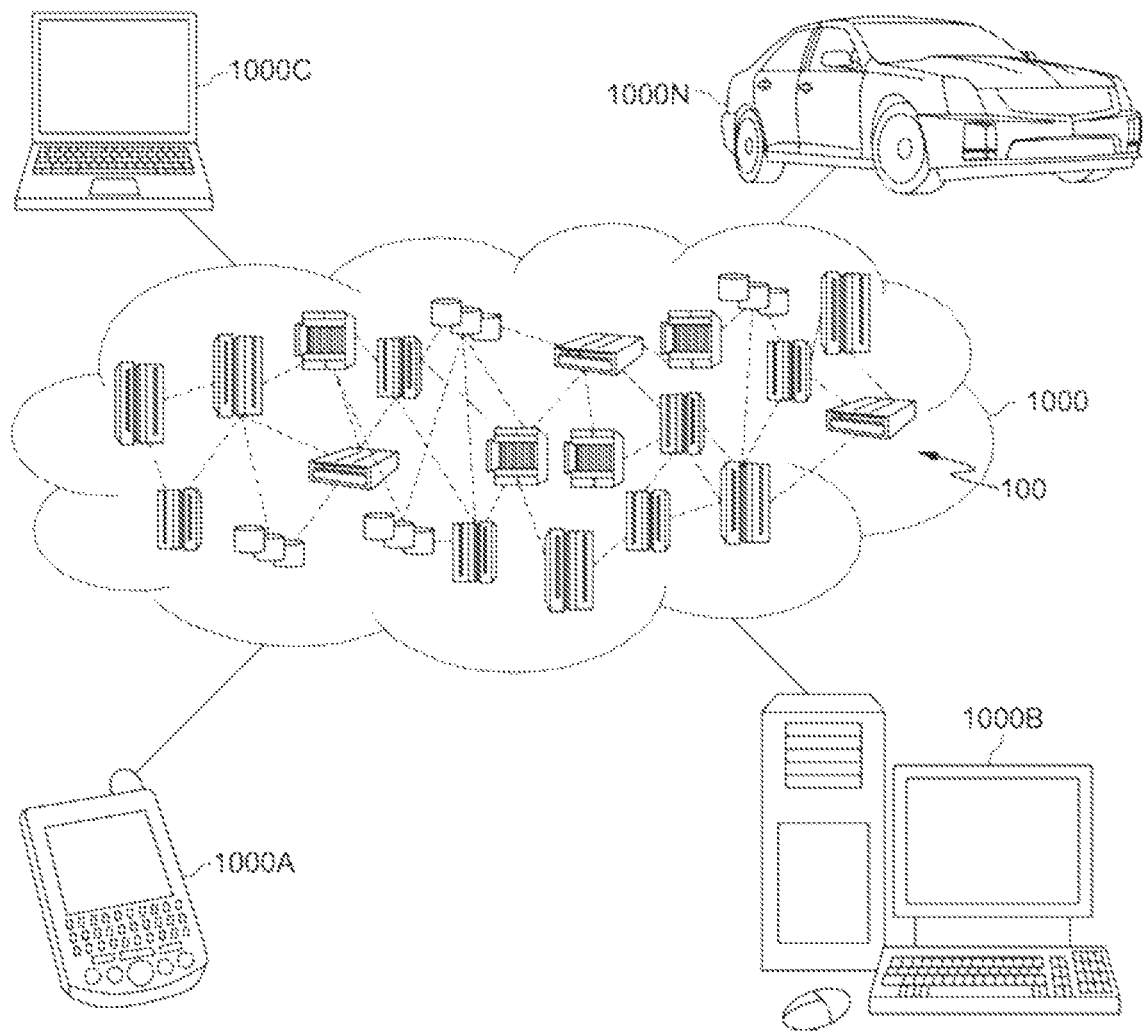
FIG. 10 is a block diagram of an illustrative cloud computing environment including the computer system depicted in FIG. 1, in accordance with an embodiment of the present disclosure.

Referring now to FIG. 10, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 10 are intended to be illustrative only and that computing nodes 100 and cloud computing environment 1000 can communicate with any type of computerized device over any type of network and/or network addressable connection (e.g., using a web browser).

Figure 11:
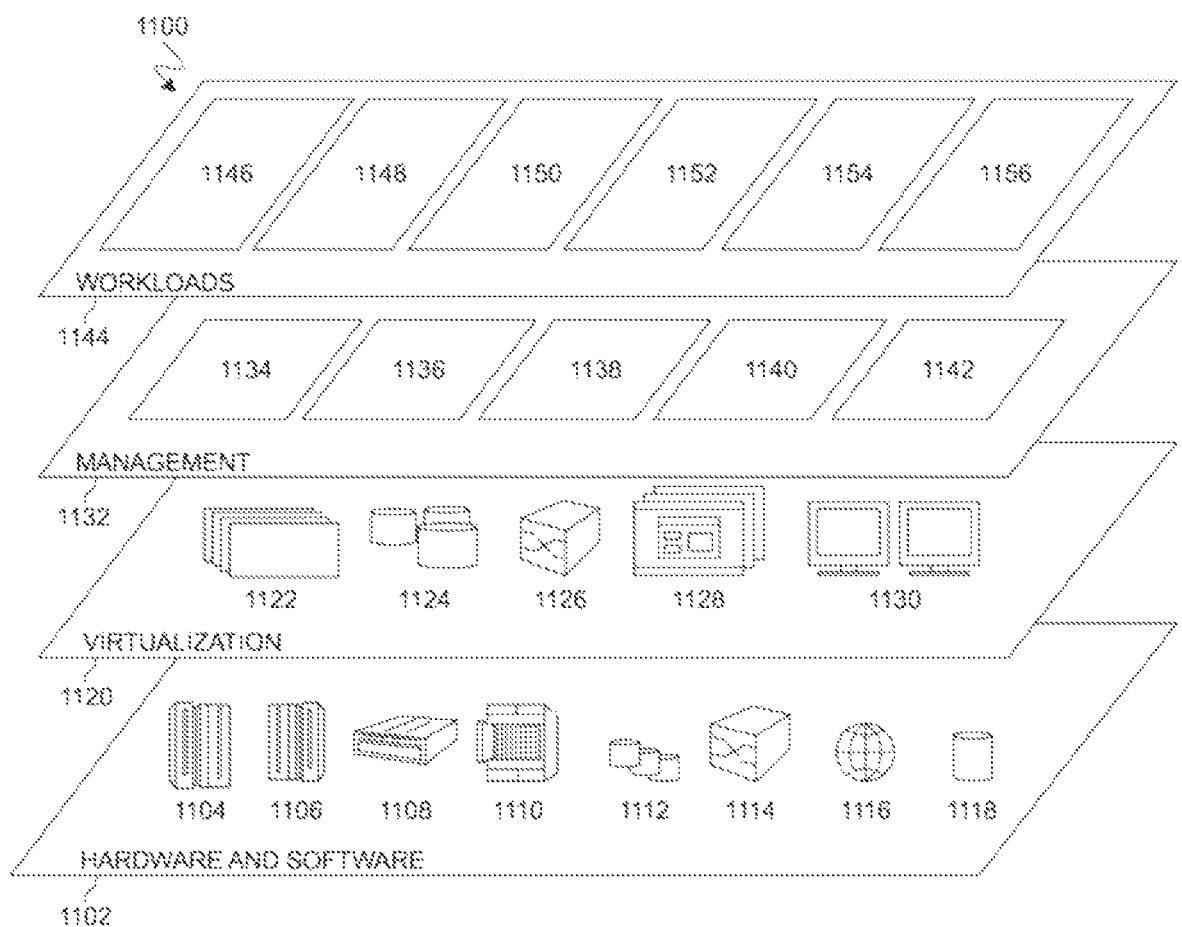
FIG. 11 is a block diagram of functional layers of the illustrative cloud computing environment of FIG. 6, in accordance with an embodiment of the present disclosure.

Referring now to FIG. 11, a set of functional abstraction layers 1100 provided by cloud computing environment 1000 is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and labeling optimization 1156. A BPA program 110a, 110b provides a way to perform unsupervised image clustering of generated customer transaction timeline images to efficiently label the transaction timeline image clusters to train a model to predict transaction behaviors.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a plurality of labeled historical transaction timeline image clusters based on a plurality of historical transaction timeline images clustered using unsupervised machine learning;
training an image recognition model using supervised machine learning based on the received plurality of labeled historical transaction timeline image clusters;
receiving, by the trained image recognition model, a current transaction timeline image; and
assigning a corresponding label to the received current transaction timeline image based on matching the received current transaction timeline image to one of the received plurality of labeled historical transaction timeline image clusters.

2. The method of claim 1, wherein the corresponding label assigned to the received current transaction timeline image includes a behavioral pattern label matching at least one of a plurality of known behavioral patterns.

3. The method of claim 1, wherein the plurality of historical transaction timeline images includes a global color-coding scheme, wherein each transaction type represented in the plurality of historical transaction timeline images includes an assigned color.

4. The method of claim 1, further comprising:
receiving a plurality of transaction records associated with a customer; and
generating a transaction timeline image based on the received plurality of transaction records associated with the customer, wherein the generated transaction timeline image includes a graphic representation of a corresponding transaction history associated with the customer.

5. The method of claim 1, further comprising:
transmitting the clustered plurality of historical transaction timeline images to a computing device associated with a subject matter expert (SME); and
generating a user interface (UI) on the computing device associated with SME to receive a group label for each historical transaction timeline image cluster of the clustered plurality of historical transaction timeline images.

6. The method of claim 1, wherein receiving the plurality of labeled historical transaction timeline image clusters further comprises:
receiving a label for each historical transaction timeline image cluster; and
assigning the received label to each timeline image of the historical transaction timeline image cluster.

7. The method of claim 5, further comprising:
ordering, in the generated UI, the clustered plurality of historical transaction timeline images by a cluster relationship strength.

8. A computer system for labeling optimization, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:

receiving a plurality of labeled historical transaction timeline image clusters based on a plurality of historical transaction timeline images clustered using unsupervised machine learning;

training an image recognition model using supervised machine learning based on the received plurality of labeled historical transaction timeline image clusters;

receiving, by the trained image recognition model, a current transaction timeline image; and assigning a corresponding label to the received current transaction timeline image based on matching the received current transaction timeline image to one of the received plurality of labeled historical transaction timeline image clusters.

9. The computer system of claim 8, wherein the corresponding label assigned to the received current transaction timeline image includes a behavioral pattern label matching at least one of a plurality of known behavioral patterns.

10. The computer system of claim 8, wherein the plurality of historical transaction timeline images includes a global color-coding scheme, wherein each transaction type represented in the plurality of historical transaction timeline images includes an assigned color.

11. The computer system of claim 8, further comprising:
receiving a plurality of transaction records associated with a customer; and
generating a transaction timeline image based on the received plurality of transaction records associated with the customer, wherein the generated transaction timeline image includes a graphic representation of a corresponding transaction history associated with the customer.

12. The computer system of claim 8, further comprising:
transmitting the clustered plurality of historical transaction timeline images to a computing device associated with a subject matter expert (SME); and
generating a user interface (UI) on the computing device associated with SME to receive a group label for each historical transaction timeline image cluster of the clustered plurality of historical transaction timeline images.

13. The computer system of claim 8, wherein receiving the plurality of labeled historical transaction timeline image clusters further comprises:
receiving a label for each historical transaction timeline image cluster; and
assigning the received label to each timeline image of the historical transaction timeline image cluster.

14. The computer system of claim 12, further comprising:
ordering, in the generated UI, the clustered plurality of historical transaction timeline images by a cluster relationship strength.

15. A computer program product for labeling optimization, comprising:
one or more computer-readable storage media and program instructions collectively stored on the one or more computer-readable storage media, the program instructions executable by a processor to cause the processor to perform a method comprising:

receiving a plurality of labeled historical transaction timeline image clusters based on a plurality of historical transaction timeline images clustered using unsupervised machine learning;

training an image recognition model using supervised machine learning based on the received plurality of labeled historical transaction timeline image clusters;

receiving, by the trained image recognition model, a current transaction timeline image; and assigning a corresponding label to the received current transaction timeline image based on matching the received current transaction timeline image to one of the received plurality of labeled historical transaction timeline image clusters.

16. The computer program product of claim 15, wherein the corresponding label assigned to the received current transaction timeline image includes a behavioral pattern label matching at least one of a plurality of known behavioral patterns.

17. The computer program product of claim 15, wherein the plurality of historical transaction timeline images includes a global color-coding scheme, wherein each transaction type represented in the plurality of historical transaction timeline images includes an assigned color.

18. The computer program product of claim 15, further comprising:
receiving a plurality of transaction records associated with a customer; and
generating a transaction timeline image based on the received plurality of transaction records associated with the customer, wherein the generated transaction timeline image includes a graphic representation of a corresponding transaction history associated with the customer.

19. The computer program product of claim 15, further comprising:
transmitting the clustered plurality of historical transaction timeline images to a computing device associated with a subject matter expert (SME); and
generating a user interface (UI) on the computing device associated with SME to receive a group label for each historical transaction timeline image cluster of the clustered plurality of historical transaction timeline images.

20. The computer program product of claim 15, wherein receiving the plurality of labeled historical transaction timeline image clusters further comprises:
receiving a label for each historical transaction timeline image cluster; and
assigning the received label to each timeline image of the historical transaction timeline image cluster.

* * * * *